US009897109B2

(12) United States Patent
Shen

(10) Patent No.: US 9,897,109 B2
(45) Date of Patent: Feb. 20, 2018

(54) FAN VIBRATION DAMPING STRUCTURE AND FAN WITH THE VIBRATION DAMPING STRUCTURE

(71) Applicant: ASIA VITAL COMPONENTS CO., LTD., New Taipei (TW)

(72) Inventor: Ching-Hang Shen, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 372 days.

(21) Appl. No.: 14/791,476

(22) Filed: Jul. 5, 2015

(65) Prior Publication Data

US 2017/0002837 A1    Jan. 5, 2017

(51) Int. Cl.
| | | |
|---|---|---|
| F01D 25/04 | (2006.01) | |
| F04D 29/66 | (2006.01) | |
| F04D 19/00 | (2006.01) | |
| F04D 29/059 | (2006.01) | |
| F16C 19/54 | (2006.01) | |
| F16C 19/52 | (2006.01) | |
| F16C 27/04 | (2006.01) | |
| F04D 25/06 | (2006.01) | |
| F04D 29/063 | (2006.01) | |

(52) U.S. Cl.
CPC ......... *F04D 29/668* (2013.01); *F04D 19/002* (2013.01); *F04D 25/062* (2013.01); *F04D 29/059* (2013.01); *F16C 19/527* (2013.01); *F16C 19/54* (2013.01); *F16C 27/04* (2013.01); *F04D 29/063* (2013.01)

(58) Field of Classification Search
CPC ........................... F16C 19/527; F04D 29/046
See application file for complete search history.

(56) References Cited

U.S. PATENT DOCUMENTS

| | | | | |
|---|---|---|---|---|
| 5,562,347 A | * | 10/1996 | Hsieh | F16C 35/02 384/215 |
| 5,982,066 A | * | 11/1999 | Marracino | F16C 35/04 310/67 R |
| 8,651,830 B2 | * | 2/2014 | Shen | F04D 29/083 310/89 |
| 2013/0216376 A1 | | 8/2013 | Nicgorski et al. | |
| 2016/0102672 A1 | * | 4/2016 | Liu | F04D 29/058 417/423.12 |

\* cited by examiner

*Primary Examiner* — Logan Kraft
*Assistant Examiner* — Jason Fountain
(74) *Attorney, Agent, or Firm* — Nikolai & Mersereau, P.A.; C. G. Mersereau

(57) ABSTRACT

A fan vibration damping structure and a fan with the vibration damping structure. The fan vibration damping structure includes a bearing cup, a first bearing, a second bearing, a third bearing, an elastic member and at least one oil seal. The bearing cup has an internal receiving space and a bearing hole in communication with each other. The first, second and third bearings and the elastic member are disposed in the receiving space. A high-viscosity-coefficient oil is filled in the receiving space. The fan vibration damping structure is applied to the fan to greatly reduce vibration of the fan in operation.

9 Claims, 4 Drawing Sheets

FAN VIBRATION DAMPING STRUCTURE AND FAN WITH THE VIBRATION DAMPING STRUCTURE

BACKGROUND OF THE INVENTION

1. Field of the Invention

The present invention relates generally to a fan vibration damping structure and a fan with the vibration damping structure. The fan vibration damping structure is able to reduce vibration of the fan in operation.

2. Description of the Related Art

It is known that cooling fan is a heat dissipation unit, which has very good heat dissipation efficiency and is very flexible to assemble with other heat dissipation component. The cooling fan is widely applied to various apparatuses necessitating heat dissipation, including transportation tools, domestic electrical products and air-conditioning equipments, to dissipate the heat generated by these apparatuses.

The inductive magnetization between the rotor and stator of the cooling fan causes the rotor to rotate relative to the stator. The blades of the fan impeller on the rotor are rotated along with the rotor to forcedly guide airflow for dissipating the heat. The cooling fans can be classified into axial-flow fan, cross-flow fan and centrifugal fan. Currently, the axial-flow fan is most often used to forcedly dissipate the heat generated by the heat generation units or electronic components in the electronic equipment. In operation, the cooling fan will inevitably more or less vibrate to affect the operation of some sophisticated electronic units of the electronic equipment, such as the hard disc. No matter which type the cooling fan pertains to, the cooling fan will vibrate in operation. In certain specific situations, no vibration is allowable. Therefore, it is a currently most critical topic how to eliminate the vibration of the cooling fan.

SUMMARY OF THE INVENTION

It is therefore a primary object of the present invention to provide a fan vibration damping structure, which is able to reduce vibration of the fan in operation.

It is a further object of the present invention to provide a fan with the fan vibration damping structure.

To achieve the above and other objects, the fan vibration damping structure of the present invention includes a bearing cup, a first bearing, a second bearing, a third bearing, an elastic member, at least one oil seal and high-viscosity-coefficient oil.

The bearing cup has an internal receiving space and a bearing hole in communication with each other. The first, second and third bearings, the elastic member and the oil seal are received in the receiving space. The high-viscosity-coefficient oil is filled in the receiving space.

To achieve the above and other objects, the fan with the vibration damping structure of the present invention includes a bearing cup, a first bearing, a second bearing, a third bearing, an elastic member, at least one oil seal, high-viscosity-coefficient oil, a rotor and a stator.

The bearing cup has an internal receiving space and a bearing hole in communication with each other. The first, second and third bearings, the elastic member and the oil seal are received in the receiving space. The high-viscosity-coefficient oil is filled in the receiving space. The rotor has a fan impeller hub and a shaft perpendicularly extending from the fan impeller hub. The shaft is rotatably fitted in the first, second and third bearings. The stator is fitted around the bearing cup.

In the present invention, the high-viscosity-coefficient oil is filled in the internal receiving space of the bearing cup between the bearings and the elastic member. In this case, the axial vibration push force of the fan is not only damped by the elastic member, but also damped by the high-viscosity-coefficient oil filled in the receiving space as damping or shock absorption means. Therefore, a true vibration damping effect is provided.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
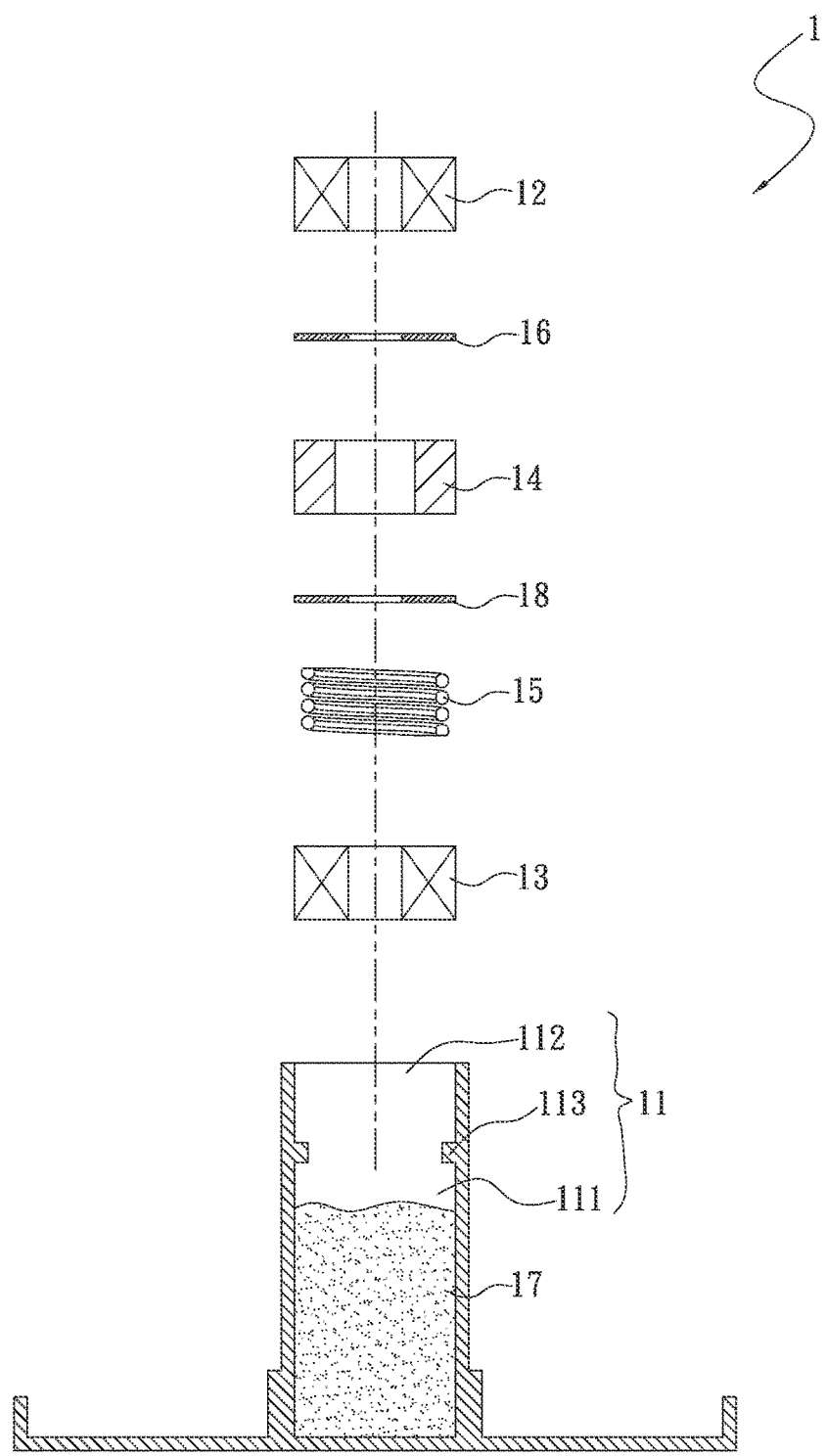
FIG. 1 is a sectional exploded view of a first embodiment of the fan vibration damping structure of the present invention.
Figure 2:
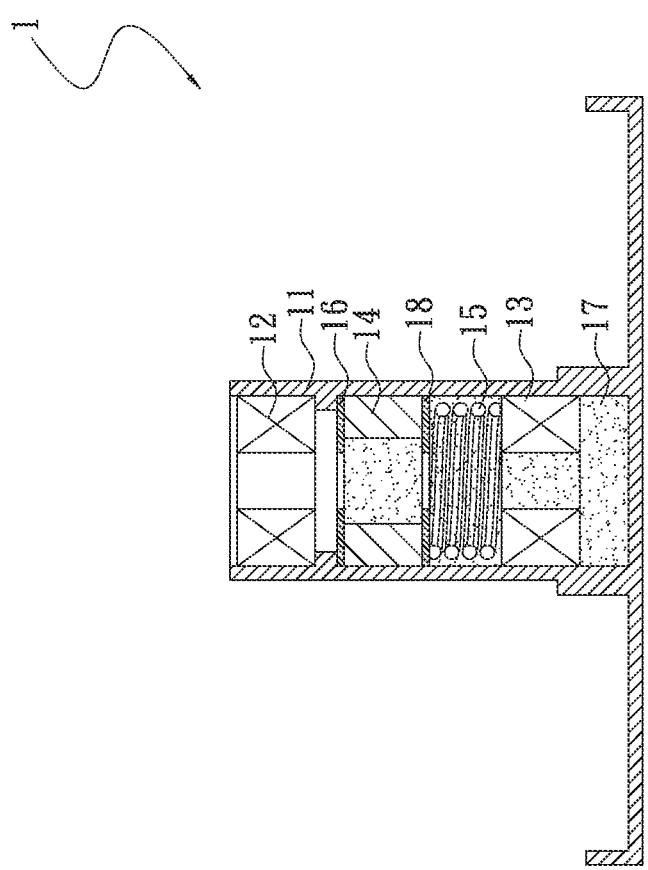
FIG. 2 is a sectional assembled view of the first embodiment of the fan vibration damping structure of the present invention.

Please refer to FIGS. 1 and 2. FIG. 1 is a sectional exploded view of a first embodiment of the fan vibration damping structure of the present invention. FIG. 2 is a sectional assembled view of the first embodiment of the fan vibration damping structure of the present invention. According to the first embodiment, the fan vibration damping structure 1 of the present invention includes a bearing cup 11, a first bearing 12, a second bearing 13, a third bearing 14, an elastic member 15, at least one oil seal 16, high-viscosity-coefficient oil 17 and a locating member 18.

The bearing cup 11 has an internal receiving space 111 and a bearing hole 112 in communication with the receiving space 111. The first, second and third bearings 12, 13, 14, the elastic member 15 and the oil seal 16 are received in the receiving space 111. The high-viscosity-coefficient oil 17 is filled in the receiving space 111. A stop section 113 radially protrudes from the bearing cup 11 into the receiving space 111. The stop section 113 provides axial restriction effect. One side of the first bearing 12 abuts against the stop section 113.

The first and second bearings 12, 13 are disposed at two ends of the receiving space 111. The oil seal 16 is disposed between the first and third bearings 12, 14. That is, in an upward sequence, in the receiving space 111 of the bearing cup 11 are disposed the second bearing 13, the elastic member 15, the locating member 18, the third bearing 14, the oil seal 16 and the first bearing 12. The first and third bearings 12, 14 are respectively disposed on two sides of the stop section 113. The high-viscosity-coefficient oil 17 is filled between the third bearing 14 and the second bearing 13.

In this embodiment, the first and second bearings 12, 13 are ball bearings. The third bearing 14 is an oil-retaining bearing. Alternatively, all the bearings can be ball bearings or oil-retaining bearings or an assembly thereof. This is not limited.

The locating member 18 is positioned between the third bearing 14 and the elastic member 15. The locating member 18 is a retainer ring and the elastic member 15 is a compression spring.

Figure 3:
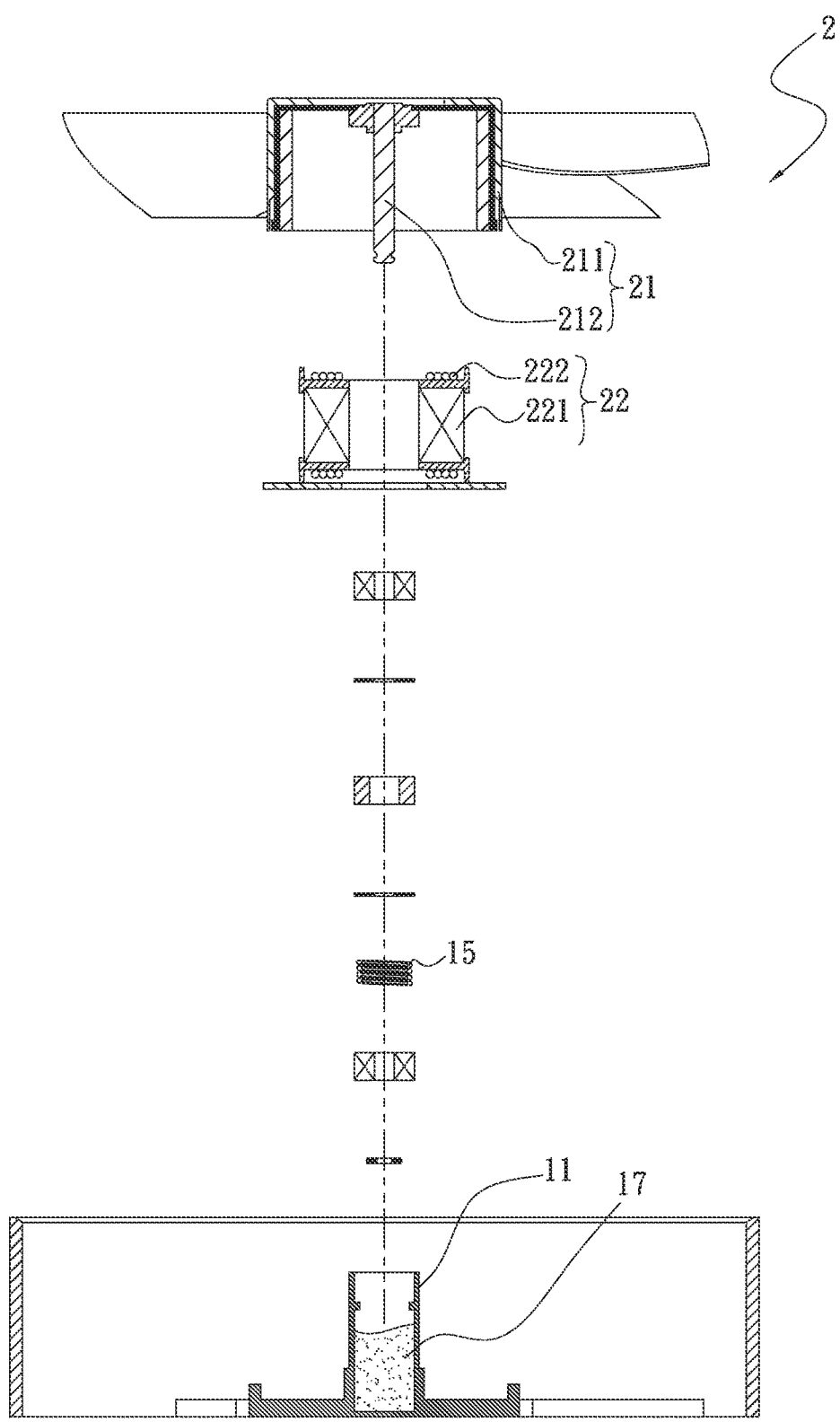
FIG. 3 is a sectional exploded view of a first embodiment of the fan with the vibration damping structure of the present invention.
Figure 4:
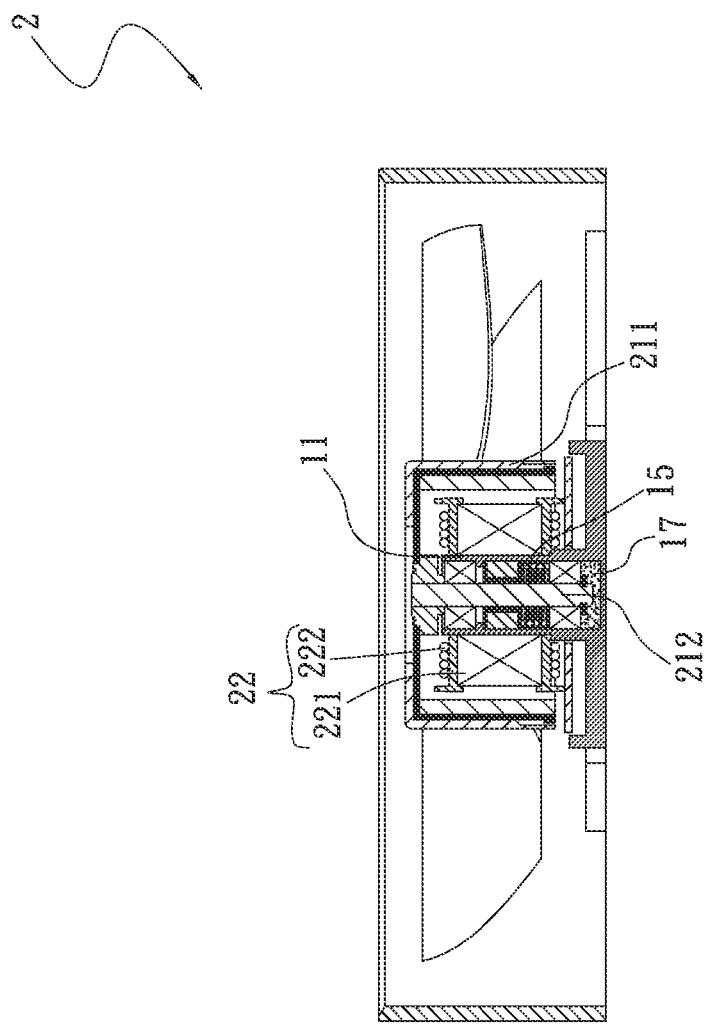
FIG. 4 is a sectional assembled view of the first embodiment of the fan with the vibration damping structure of the present invention.

Please now refer to FIGS. 3 and 4. FIG. 3 is a sectional exploded view of a first embodiment of the fan with the vibration damping structure of the present invention. FIG. 4 is a sectional assembled view of the first embodiment of the fan with the vibration damping structure of the present invention. As shown in the drawings, the fan 2 with the vibration damping structure of the present invention includes a bearing cup 11, a rotor 21 and a stator 22.

The structure of the bearing cup 11 is identical to the first embodiment of the fan vibration damping structure 1 of the present invention and thus will not be repeatedly described. As referring to the above description about the fan vibration damping structure 1 and FIGS. 1 and 2, the stator 22 is fitted around the bearing cup 11. The rotor 21 has a fan impeller hub 211 and a shaft 212 perpendicularly extending from the fan impeller hub 211. The shaft 212 is rotatably fitted in the first, second and third bearings 12, 13, 14. The stator 22 has multiple silicon steel sheets 221 and multiple windings 222 wound around the silicon steel sheets 221.

The present invention is improved from the conventional device in which only an elastic member is used to provide vibration damping effect for the fan in operation.

In the present invention, the high-viscosity-coefficient oil 17 is further filled in the receiving space of the bearing cup 11 to provide cushioning and vibration damping effect. In the present invention, the damping concept of a shock-absorber is applied to the bearing cup of the fan to provide vibration damping effect. The high-viscosity-coefficient oil is able to damp the vibration in both axial direction and radial direction when the fan operates.

The present invention has been described with the above embodiments thereof and it is understood that many changes and modifications in the above embodiments can be carried out without departing from the scope and the spirit of the invention that is intended to be limited only by the appended claims.

What is claimed is:

1. A fan vibration damping structure comprising a bearing cup, the bearing cup having a bearing hole and a receiving space in communication with each other, a first bearing and a second bearing being disposed in the receiving space, a third bearing, an elastic member, and at least one oil seal being disposed between the first and second bearings, an oil being filled between the first and second bearings.

2. The fan vibration damping structure as claimed in claim 1, wherein the first and second bearings are ball bearings, while the third bearing is an oil-retaining bearing.

3. The fan vibration damping structure as claimed in claim 1, wherein a locating member is further disposed between the third bearing and the elastic member, the first and second bearings being disposed at two ends of the receiving space, the oil seal being disposed between the first and third bearings, the locating member being disposed between the third bearing and the elastic member.

4. The fan vibration damping structure as claimed in claim 3, wherein the locating member is a retainer ring.

5. The fan vibration damping structure as claimed in claim 1, wherein a stop section radially protrudes from the bearing cup into the receiving space and one side of the first bearing abuts against the stop section.

6. A fan with a fan vibration damping structure, comprising: a bearing cup having an internal receiving space, a first bearing and a second bearing being disposed in the receiving space, a third bearing, an elastic member, and at least one oil seal being disposed between the first and second bearings, an oil being filled between the first and second bearings;
a rotor having a fan impeller hub and a shaft perpendicularly extending from the fan impeller hub, the shaft being rotatably fitted in the first, second and third bearings; and
a stator fitted around the bearing cup.

7. The fan with the fan vibration damping structure as claimed in claim 6, wherein the first and second bearings are ball bearings, while the third bearing is an oil-retaining bearing.

8. The fan with the fan vibration damping structure as claimed in claim 6, wherein a locating member is further disposed between the third bearing and the elastic member, the first and second bearings being disposed at two ends of the receiving space, the oil seal being disposed between the first and third bearings, the locating member being disposed between the third bearing and the elastic member.

9. The fan with the fan vibration damping structure as claimed in claim 8, wherein the locating member is a retainer ring.

* * * * *